Figure 1:
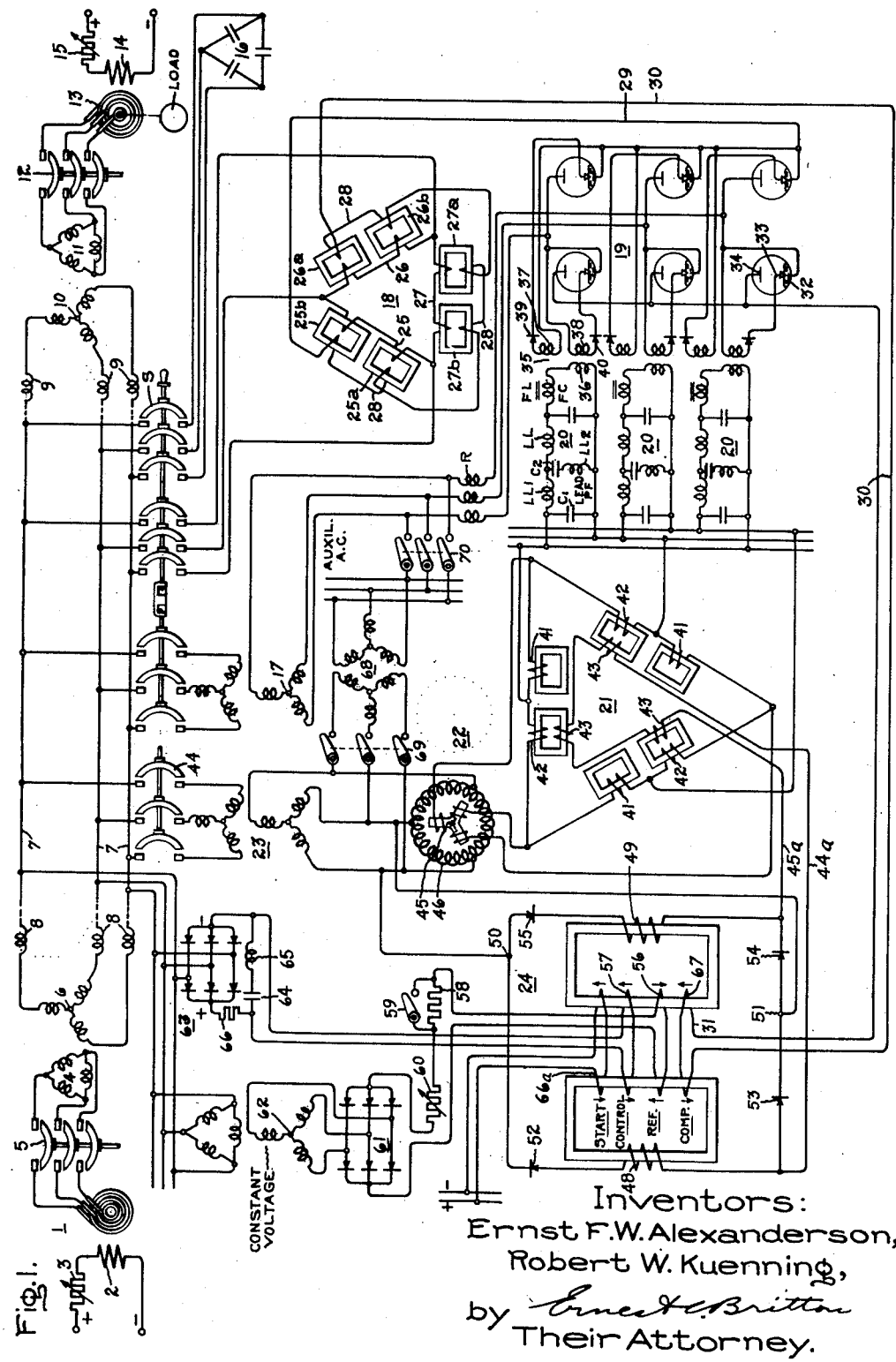

Inventors:
Ernst F. W. Alexanderson,
Robert W. Kuenning,
by Ernest C. Britton
Their Attorney.

Patented July 7, 1953

2,644,898

UNITED STATES PATENT OFFICE 2,644,898

STABILIZER FOR ALTERNATING CURRENT POWER TRANSMISSION SYSTEMS

Ernst F. W. Alexanderson, Schenectady, N. Y., and Robert W. Kuenning, Berkeley, Calif., assignors to General Electric Company, a corporation of New York Application February 28, 1951, Serial No. 213,272

7 Claims. (Cl. 307—102)

This invention relates to stabilizers for alternating currnt power transmission systems and more particularly to an improved stabilizer arrangement which is especially applicable to systems which transmit power over long distances.

In Patent 2,470,454—Alexanderson granted May 17, 1949, and assigned to the assignee of this invention, an arrangement is disclosed wherein stabilizer means is connected to the power system and arranged to draw reactive current therefrom, the magnitude of which varies in accordance with variations in the phase angle between the voltage of the generator or sending end machine and the voltage of the motor or receiving end machine. By this means an artificial synchronizing force is introduced which makes it possible to transmit a greater amount of power without causing the system to lose synchronism than would be transmitted without the aid of stabilizer means. Furthermore, if the stability limits of a system are increased by a stabilizer arrangement such as is disclosed in the above Alexanderson patent, voltage regulation, being closely interrelated with stability, is also greatly improved.

In the above-mentioned Alexanderson patent inductive reactance means of the air core type is connected across the line conductors and the flow of reactive current therethrough is controlled by electronic means which is responsive to changes in the phase relationship between the sending and receiving machine. Reactive current normally flowing through the air core reactor is reduced as the phase angle between the terminal machines increases and the voltage of the system is thereby increased or at least prevented from being reduced appreciably. In this way regulation and stability of the system are improved substantially. By an alternative arrangement disclosed in the above Alexanderson patent, capacitive reactance means is connected across the system conductors in addition to the inductive reactance means. By controlling the flow of inductive reactive current through the inductive reactance means in accordance with the voltage at the receiving end machine, the resultant current drawn by both these reactances from the system is controlled so as to improve stability and regulation of the system.

One object of this invention is to provide an improved stabilizer arrangement which is economical to construct and maintain, which is quick to respond to changing conditions in the power system and which is adapted to be connected to high voltage system conductors at points intermediate the sending and receiving ends thereof.

A further object of the invention is the provision of an improved stabilizing and voltage regulating arrangement which is suitable for use in conjunction with synchronous condensers located at intermediate points along the line and which makes possible the use of smaller and less expensive synchronous condensers than would otherwise be required for stability and voltage regulating purposes.

In accordance with one illustrated embodiment of this invention an improved stabilizer arrangement for long distance transmission lines is provided wherein reactive current is drawn from the system by saturable impedance means and wherein the magnitude of such current is controlled by control means which regulates the impedance of the saturable impedance means in accordance with variations in a suitable electrical quantity of the system.

In accordance with another illustrated embodiment of this invention, an improved stabilizer arrangement for long distance transmission lines is provided wherein saturable impedance means is arranged to be energized from the power system and is inductively coupled with the capacitance means and wherein suitable control means which may be inductively coupled with the saturable impedance means, is used for regulating the impedance of the saturable impedance in response to changes in a predetermined electrical quantity of the system. By this means it is possible to avoid connecting capacitors capable of withstanding high transmission voltages, and which are expensive to construct, directly to the high voltage system conductors, or, alternatively, to avoid the use of a step-down transformer for the purpose of connecting capacitors of a low voltage rating to the high voltage line conductors.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawings, in which Fig. 1 is a diagrammatic representation of one embodiment of the invention, and in which Fig. 2 is a diagrammatic representation of another embodiment of the invention.

Figure 2:
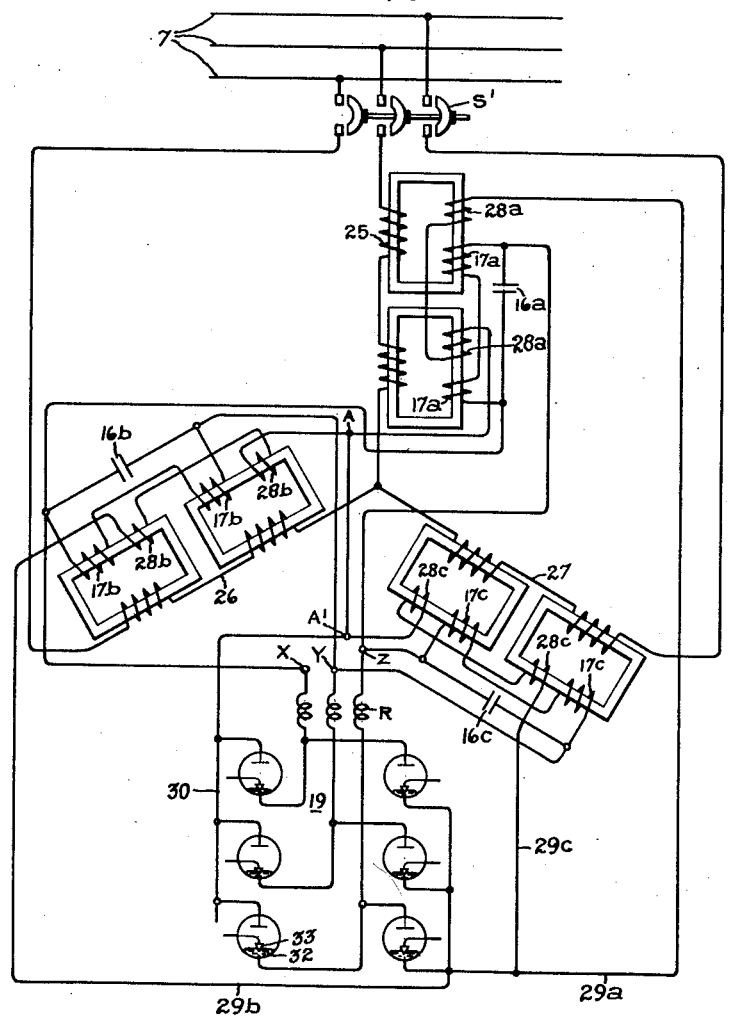

In Fig. 1 the generator or sending end machine is designated by the numeral 1. Generator 1 is provided with a schematically represented field winding 2 controlled from a suitable direct current source by the variable resistance means 3. Generator 1 is connected to the primary winding 4 of a power transformer through schematically represented circuit breaker 5. Secondary winding 6 of the power transformer is connected to the transmission line 7 which is shown dotted at two places to indicate greater length. The reactance of transmission line 7 is schematically represented by reactors 8 and 9. The receiving end of the transmission line is connected to the primary winding 10 of the power transformer whose secondary winding 11 is connected through circuit breaker 12 to the motor or receiving end machine 13. As is indicated, motor 13 is provided with a field winding 14 which is energized from a suitable direct current source through variable resistance means 15. It will be understood that transmission line 7 ordinarily would be of the order of 300 miles or more in length and that the stabilizer arrangement comprising the invention is particularly adapted to be used at points intermediate the ends of transmission line 7 and, if desired, the stabilizer comprising the invention could be used as a supplementary means for synchronous condensers disposed intermediate the ends of the transmission line.

As in the above-mentioned Alexanderson patent, capacitive reactance means and inductive reactance means are arranged to be connected to the system conductors and control of the inductive reactance means is effected in such manner as to improve system stability and voltage regulation. As illustrated in Fig. 1, a 3 phase capacitor 16 is arranged to be connected to the system through the master control switch S and the controllable inductive reactance means generally designated by the numeral 18 is also arranged to be connected to transmission line 7 through suitable contacts of switch S. The reactance of saturable reactor 18 is controlled by the 3 phase, full-wave rectifier generally designated by the numeral 19. Rectifier 19 as schematically represented is made up of six electron tubes of the ignitron type which are controlled by firing circuits generally designated by the numeral 20. Firing circuits 20 are energized from the system through a suitable phase shifting device generally indicated by the numeral 21, a phase adjuster schematically represented and indicated generally by the numeral 22, and through the transformer generally designated by the numeral 23. Phase shift device 21 is controlled by the magnetic amplifier generally designated by the numeral 24 which is arranged to be energized from the system and which is provided with suitable control windings responsive to the system voltage in a manner to be explained in more detail hereinafter. Thus, changes in the system voltage cause the magnetic amplifier to effect a control operation in respect to phase shift circuit 21 which in turn controls firing circuits 20 which in turn control the output of the rectifier arrangement 19. The output of rectifier 19 by means of a suitable control winding on saturable reactor 18 controls the value of this reactance so as to perform the desired result, i. e., to improve voltage regulation and stability of the system comprising transmission line 7, sending end machine 1 and motor 13.

Saturable reactor 18 is provided with main windings 25, 26 and 27, which are arranged in a delta circuit and energized from transmission line 7 through switch S. It will be observed that the winding 25 is wound on two separate cores 25a and 25b while the other two windings 26 and 27 are also wound on separate cores. Control of the saturable reactor 18 is effected by control winding 28 which is inductively coupled with all of the six cores used in saturable reactor 18 and which is supplied with direct current from rectifier 19. It will be observed that the portion of control winding 28 which is coupled with one core of each phase of device 18 is reversely wound with respect to the portion of winding 28 which is inductively coupled with the other core of each phase of device 18. In this way flow of control current through winding 28 is effective during each half cycle to aid the magnetizing effect of the current flowing through one of the main windings such as 25, 26 and 27 insofar as one of the cores in each phase is concerned. Furthermore, during such half cycle the magnetizing effect of the control winding 28 opposes the magnetizing action of the current flowing through each of the main windings such as 25, 26 and 27 insofar as the other core in each phase is concerned. During alternate half cycles of current through the main windings such as 25, 26 and 27, the magnetizing effect of control winding 28 is reversed with respect to each core in each phase of device 18 due to changes in direction of current through the main windings. In this way control winding 28 is effective during each half cycle to control the reactance of variable reactor 18.

Control winding 28 of device 18 is energized through conductors 29 and 30, the energization of which is controlled by the 3 phase, full-wave rectifier 19. The output of rectifier 19 is also caused to flow through a compensating winding 31 of the magnetic amplifier for reasons which will appear hereinafter.

Each valve of the rectifier 19 as indicated is of the ignitron type and is provided with a cathode comprising a mercury pool 32, an ignitor 33, a plate 34 and other control elements not shown. The six tubes comprising the rectifier 19 are connected for 3 phase full-wave rectification.

Each pair of ignitrons is controlled by an ignitor firing circuit 20 which as indicated is of the type disclosed and claimed in Patent 2,362,293—Mittag granted November 7, 1944, and assigned to the assignee of this invention. Firing circuits 20 are coupled to their associated reactors through ignitor coupling transformers 35 which are provided with a primary winding 36 and a pair of secondary windings 37 and 38. Windings 37 are connected to the appropriate ignitor 33 through unidirectional conducting devices 39 while winding 38 is connected to appropriate ignitor 33 through unidirectional conducting devices 40. As is disclosed more fully in the above-mentioned Mittag patent, each firing circuit 20 comprises a nonlinear firing reactor FL, a firing capacitor FC, and a linear reactor LL. As is also disclosed in the above Mittag patent phase shifting means may be used which includes linear reactors $LL_1$ and $LL_2$ and capacitors $C_1$ and $C_2$.

Phase shifting circuit 21 as illustrated is of the type disclosed in application Serial No. 84,208—Price, filed March 29, 1949, and assigned to the assignee of this invention. As illustrated, phase shift circuit 21 includes three branch circuits each of which includes a fixed reactor 41 and a variable reactor 42. The reactance of each variable reactor 42 is controlled by means of a control winding 43 which is energized with direct current through conductors 44a and 45a from the output of the magnetic amplifier 24. The output of phase shift circuit 21 is fed to the ignitor firing circuits 20 from the junction points between each fixed reactor 41 and each variable reactor 42.

Phase shift circuit 21 is energized as already explained through phase adjusting device 22 and transformer 23 which is arranged to be energized from the transmission line 7 when switch 44 is closed. The phase adjusting device 22 may be of the rotary type having a movable polyphase secondary winding 45 and a polyphase stator winding 46.

As has already been explained control current for phase shifting circuit 21 is supplied from magnetic amplifier 24 through conductors 44a and 45a. As illustrated, magnetic amplifier 24 includes a main winding 48 and another main winding 49. Main windings 48 and 49 are energized from transformer 23 which is connected to the amplifier circuit at input terminals 50 and 51. Arranged in series with winding 48 are the rectifier elements 52 and 53 while rectifiers 54 and 55 are arranged in series with winding 49. Thus, when terminal 50 is positive, current can flow downwardly through rectifier 55 and main winding 49 through conductor 45a, control winding 43, conductor 44a, through rectifier 53 to terminal 51. When terminal 51 is positive, current flows through rectifier 54, conductor 45a, coil 43, conductor 44a, upwardly through main winding 48, rectifier 52 and to the negative terminal 50. Thus, a unidirectional control current is supplied from magnetic amplifier 24 to the control winding 43 of phase shifting device 21.

The magnitude of control current supplied by device 24 to phase shift circuit 21 is controlled by the reference winding 56 acting in conjunction with the control winding 57 which windings are arranged in opposition to each other. Reference winding 56 is energized through resistor 58 which as shown is provided with a short circuiting switch 59, through variable resistor 60, rectifier arrangement generally indicated by the numeral 61, from the constant voltage reference transformer 62. Constant voltage transformer 62, as its name implies, maintains a constant output voltage which with a particular adjustment of device 60 and a particular position for switch 59 would establish a fixed magnetizing effect for the reference winding 56. It will be understood that switch 59 forms no part of the invention and is included as a means for obtaining an adjustment of current in the reference winding. Control winding 57 is energized from the rectifier arrangement generally designated by the numeral 63 which in turn is energized from transmission line 7. If desired a circuit including capacitor 64 and reactor 65 could be connected across the output of rectifier 63 and could be arranged to act to filter out undesired ripple, while the resistor 66 is used to limit the current output of the rectifier 63 to the control winding 57. Since rectifier arrangement 63 is directly connected to transmission line 7 the voltage of the line will be reflected in the degree of magnetization of the magnetic amplifier 24 accomplished by the control winding 57. Since control winding 57 and reference winding 56 are arranged so that their magnetizing effects are in opposition it will be obvious that the resultant bias supplied to the magnetic amplifier 24 will be governed by the voltage of transmission line 7. In this way voltage changes in the transmission line are reflected through phase shifting device 21, and ignitor firing circuits 20, so as to advance or retard the ignitor firing angle of the ignitors 33 to control in known manner the magnitude of current supplied through conductors 29 and 30 to the control winding 28 of saturable reactor 18. Obviously rectifiers 63 could be connected to transmission line 7 through a suitable transformer.

For the purpose of making sure that the magnetization of magnetic amplifier 24 is in the proper range when the apparatus is connected to the transmission line, a starting winding 66a is provided. Starting winding 66a would be energized from a suitable source of direct current and its magnetizing effect would be in opposition to that of the reference winding and in the same direction as that of the control winding.

The compounding winding 67 of the magnetic amplifier 24 as already pointed out is in series with the output of the rectifier arrangement 19 and with the control winding 28 of the saturable reactor 18. Compounding winding 67 is not essential to the operation of the system and is merely an additional feature. This winding is arranged so that its magnetizing effect is in opposition to the reference winding so that a decrease in the load on transmission line 7 causing an increase in current flow through winding 28 of saturable reactor 18 will subtract from the reference winding. By the same token, an increase in load on transmission line 7 will result in a decrease in current through winding 28 and compensating winding 67 so that in effect a slightly rising load-voltage characteristic for the transmission line is obtained. Should a flat or a slightly drooping characteristic prove desirable for a particular condition, the elements could be arranged to produce such results.

Ordinarily, the power circuit through each of the tubes of the rectifier 19 would be energized from the transmission line 7 through switch S and transformer 17 as well as through reactors R. However, in order to place the control system in service, it is desirable to establish suitable control in the control winding 28 of device 18 before the main windings of that device are energized upon the closing of switch S. Thus, when the apparatus is started initially, switch 44 is closed which energizes magnetic amplifier 24, phase adjusting device 22, phase shift circuit 21, and the ignitor firing circuits 20 of rectifier 19. In order that the power circuit from the cathodes to the anodes of rectifier 19 may be energized before the main windings of device 18 are connected into the circuit, an auxiliary transformer 68 together with switches 69 and 70 are provided. Thus, after switch 44 is closed, switches 69 and 70 would be closed and thereafter complete control would be achieved of the flow of current through control winding 28 of device 18. When switch S is subsequently closed to connect the main windings 25, 26 and 27 of device 18 to the transmission line 7, the system is then in operation and switches 69 and 70 may thereafter be opened since the power circuit for rectifiers 19 would have a source of energization through the transformer 17.

Since the arrangement above described in connection with Fig. 1 is connected to the transmission line 7 at some point intermediate its ends, the voltage impressed on the stabilizer elements 16 and 18 will be the high voltage transmission voltage. Thus, the capacitor 16 must be constructed in such a way as to withstand such a high voltage and a step-down transformer such as 17 is necessary in order to reduce the voltage applied to the cathode-anode circuit of the ignitrons comprising rectifier 19. Since the cost of capacitors is generally and roughly proportional to the voltage which they are required to withstand, it is desirable to provide some efficient means of reducing the voltage applied to a capacitor, such as 16, without the necessity of using a relatively expensive voltage step-down transformer. Furthermore, it would be desirable to eliminate altogether the transformer 17 of Fig. 1, if possible.

By the arrangement shown in Fig. 2, a device such as the saturable reactor 18 is modified in such a way as to act both as a saturable reactor and as a step-down transformer. Such a device is commonly known as a transactor. As in Fig. 1 the transactor of Fig. 2 is provided with main windings designated 25, 26, and 27. These winding in Fig. 2 are arranged in a Y-connected circuit and are energized from the transmission line 7 through the switch S'. Obviously, the windings 25, 26, and 27 could be arranged as a delta circuit as the corresponding windings of Fig. 1 are arranged. In Fig. 2 the control winding having branches 28a, 28b, and 28c is arranged as a Y-connected winding with the center point of the Y being located at the point designated A—A'. The opposite ends of the windings 28a, 28b and 28c are connected to the rectifier 19 through the conductors 29a, 29b and 29c respectively. Thus, when the ignitors 33 of the tube rectifier 19 in Fig. 2 are controlled as in Fig. 1, the magnitude of direct control current which is caused to flow through control winding branches 28a, 28b, and 28c is regulated so as to perform the desired result as in Fig. 1. In Fig. 2 a transformer such as 17 in Fig. 1 is not necessary. The function of transformer 17 of Fig. 1 is performed by the windings 17a, 17b and 17c, operating as a secondary transformer winding off of the transactor unit of Fig. 2. Inspection of Fig. 2 will reveal that the winding legs 17a, 17b, and 17c are arranged as a delta-connected secondary winding with the junction between each leg of the delta winding being located at the points designated X, Y and Z. Thus, energy for the rectifier arrangement 19 is supplied through reactors R from the terminal points X, Y and Z so that the transformer 17 of Fig. 1 is not necessary with the arrangement shown in Fig. 2. Furthermore, in Fig. 2 the capacitance means, designated by the numerals 16a, 16b and 16c, are arranged to be connected across the secondary windings 17a, 17b and 17c respectively. Thus, the capacitors 16a, 16b and 16c are not subjected to the high voltage of transmission line 7 and may be constructed at much less expense than can the capacitor 16 of Fig. 1.

From the above it will be understood that the arrangement of Fig. 2 eliminates the transformer 17 of Fig. 1 and makes possible the use of low voltage capacitors, such as 16a, 16b and 16c by using a transactor unit instead of a saturable reactor such as 18 in Fig. 1. By the arrangement of Fig. 2, substantial reductions in the cost of the equipment are effected. Since the control of the rectifier 19 of Fig. 2 could be effected in a manner similar to the control for such units in the arrangement shown in Fig. 1, it is believed that a detailed description of such an arrangement is not necessary. Since the compounding feature using the winding 67 of Fig. 1 is not an essential feature of the invention, this feature has been omitted entirely from Fig. 2.

While particular embodiments of the invention have been shown and described, it will occur to those skilled in the art that various changes and modifications may be made without departing from the invention in its broad aspects, and it is therefore intended in the appended claims to cover all such changes and modifications as fall within the true spirit and scope of the invention.

What we claim as new and desire to secure by Letters Patent of the United States is:

1. In a system of distribution having remotely situated alternating current dynamoelectric machines with an electrically long transmission line interconnecting the same, saturable impedance means including a pair of saturable cores and a main winding wound on each core for connection in parallel relation to the transmission line, a control circuit for regulating the impedance of said saturable impedance means, said control circuit having a control winding disposed on each of said cores and arranged so that one of said control windings opposes the magnetizing action of its associated main winding and so that the other of said control windings aids the magnetizing action of its associated main winding during each half cycle of current in said main windings, and means responsive to a predetermined electrical condition of the system for controlling the energization of said control circuit in a manner to control the amount of reactive current drawn by said saturable impedance means so as to maintain a synchronous relation between said machines.

2. In a system of distribution having remotely situated alternating current dynamoelectric machines with an electrically long transmission line interconnecting the same, saturable impedance means for connection in parallel relation to the transmission line, a control circuit for regulating the impedance of said saturable impedance means, means responsive to the voltage of the system for controlling the energization of said control circuit in a manner to control the amount of reactive current drawn by said saturable impedance means so as to prevent a substantial change in the system voltage, a winding inductively coupled with said saturable impedance means, and capacitance means energized by said winding.

3. In a system of distribution having remotely situated alternating current dynamoelectric machines with an electrically long transmission line interconnecting the same, saturable impedance means including a pair of saturable cores and a main winding wound on each core for connection in parallel relation to the transmission line, a control circut for regulating the impedance of said saturable impedance means, said control circuit having a control winding disposed on each of said cores and arranged so that one of said control windings opposes the magnetizing action of its associated main winding and so that the other of said control windings aids the magnetizing action of its associated main winding during each half cycle of current in said main windings, means responsive to a predetermined electrical condition of the system for controlling the energization of said control circuit in a manner to control the amount of reactive current drawn by said saturable impedance means so as to maintain a synchronous relation between said machines, a third winding inductively coupled with each of said cores, and capacitance means connected with said third winding.

4. In a system of distribution having remotely situated alternating current dynamoelectric machines with an electrically long transmission line interconnecting the same, saturable impedance means for connection in parallel relation to the transmission line, a control circuit for regulating the impedance of said saturable impedance means, a winding inductively coupled with said saturable impedance means, and electronic means energized by said winding and controlled by the system voltage for energizing said control circuit.

5. In a system of distribution having remotely situated alternating current dynamoelectric machines with an electrically long transmission line interconnecting the same, saturable impedance means including a pair of saturable cores and a main winding wound on each core for connection in parallel relation to the transmission line, a control circut for regulating the impedance of said saturable impedance means, said control circuit having a control winding disposed on each of said cores and arranged so that one of said control windings opposes the magnetizing action of its associated main winding and so that the other of said control windings aids the magnetizing action of its associated main winding during each half cycle of current in said main windings, a third winding inductively coupled with each of said cores, electronic means energized by said third winding for controlling the energization of said control circuit, and means responsive to the system voltage for controlling said electronic means.

6. In a system of distribution having remotely situated alternating current dynamoelectric machines with an electrically long transmission line interconnecting the same, saturable impedance means including a pair of saturable cores and a main winding wound on each core for connection in parallel relation to the transmission line, a control circuit for regulating the impedance of said saturable impedance means, said control circuit having a control winding disposed on each of said cores and arranged so that one of said control windings opposes the magnetizing action of its associated main winding and so that the other of said control windings aids the magnetizing action of its associated main winding during each half cycle of current in said main windings, a third winding inductively coupled with each of said cores, electronic means energized by said third winding, for controlling the energization of said control circuit, means responsive to the system voltage for controlling said electronic means, and capacitance means energized by said third winding.

7. In a system of distribution having remotely situated alternating current dynamoelectric machines with an electrically long transmission line interconnecting the same, saturable impedance means for connection in parallel relation to the transmission line, a control circuit for regulating the impedance of said saturable impedance means, magnetic amplifier means responsive to the system voltage for controlling the energization of said control circuit, and means including a compounding winding on said magnetic amplifier and energized in accordance with the energization of said control circuit for applying a bias to said magnetic amplifier such that a predetermined system load-voltage characteristic is obtained.

ERNST F. W. ALEXANDERSON.
ROBERT W. KUENNING.

References Cited in the file of this patent

UNITED STATES PATENTS

| Number | Name | Date |
|---|---|---|
| 2,421,786 | Haug | June 10, 1947 |
| 2,470,454 | Alexanderson | May 17, 1949 |